(12) United States Patent
Stauder et al.

(10) Patent No.: US 9,788,001 B2
(45) Date of Patent: Oct. 10, 2017

(54) METHOD OF CODING A FIRST AND A SECOND VERSION OF AN IMAGE INTO A BASE LAYER AND AN ENHANCEMENT LAYER BASED ON A COLOR GAMUT MAPPING MODEL

(71) Applicant: THOMSON LICENSING, Issy de Moulineaux (FR)

(72) Inventors: Jurgen Stauder, Montreuil/Ille (FR); Philippe Bordes, Laille (FR); Corinne Poree, Rennes (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 150 days.

(21) Appl. No.: 14/655,240

(22) PCT Filed: Dec. 23, 2013

(86) PCT No.: PCT/EP2013/077938
§ 371 (c)(1),
(2) Date: Jun. 24, 2015

(87) PCT Pub. No.: WO2014/010252
PCT Pub. Date: Jul. 3, 2014

(65) Prior Publication Data
US 2015/0334412 A1  Nov. 19, 2015

(30) Foreign Application Priority Data
Dec. 26, 2012  (EP) ..................................... 12306671

(51) Int. Cl.
*H04N 19/30*   (2014.01)
*H04N 19/60*   (2014.01)
*H04N 19/136*  (2014.01)

(52) U.S. Cl.
CPC .......... *H04N 19/30* (2014.11); *H04N 19/136* (2014.11); *H04N 19/60* (2014.11)

(58) Field of Classification Search
CPC ....... H04N 19/30; H04N 19/60; H04N 19/136
See application file for complete search history.

(56) References Cited

U.S. PATENT DOCUMENTS

| 6,954,287 B1 | 10/2005 | Balasubramanian et al. |
| 7,733,525 B2 | 6/2010 | Cho et al. |
| (Continued) | | |

FOREIGN PATENT DOCUMENTS

| WO | WO2008127072 | 10/2008 |
| WO | WO2010074729 | 7/2010 |

OTHER PUBLICATIONS

Joint Collaborative Team on Video Coding (JCT-VC) of ITU-T SG16 WP3 and ISO/IEC JTC1/SC29/WG11 11th Meeting: Shanghai, CN, Oct. 10-19, 2012.*

(Continued)

*Primary Examiner* — Christopher S Kelley
*Assistant Examiner* — Nasim Nirjhar

(57) ABSTRACT

The method comprises the steps of: —determining, for each color of the second version, corresponding scalar value(s) of one or two variable(s) such that, if said scalar value(s) is applied to the color gamut mapping model, a mapped color is obtained having a minimal distance to the corresponding color of the first version (i.e. enhanced) to the color of second version, —encoding the determined scalar value(s) into an enhancement layer.

7 Claims, 2 Drawing Sheets

(56) References Cited

U.S. PATENT DOCUMENTS

| | | | |
|---|---|---|---|
| 2005/0259729 A1* | 11/2005 | Sun ....................... | H04N 19/36 375/240.1 |
| 2006/0197777 A1 | 9/2006 | Cha et al. | |
| 2007/0046691 A1 | 3/2007 | Presley et al. | |
| 2008/0267289 A1 | 10/2008 | Yu et al. | |
| 2010/0008427 A1 | 1/2010 | Chiu et al. | |
| 2010/0128786 A1 | 5/2010 | Gao et al. | |
| 2010/0272185 A1 | 10/2010 | Gao et al. | |

OTHER PUBLICATIONS

Lee et al:"Parametric Gamut Mapping Algorithms Using Variable Anchor Points",Journal of Imaging Science and Technology, SPIE—The International Society for Optical Engineering, US, vol. 44, Jan. 1, 2000 (Jan. 1, 2000),pp. 68-73.

Kerofsky et al:"Color Gamut Scalable Video Coding",11. JCT-VC Meeting; 102. MPEG Meeting;Oct. 10, 2012-Oct. 19, 2012; (Joint Collaborative Team on Video Coding of ISO/IEC JTC1/SC29/WG11 and ITU-T SG. 16; p. 1-11.

Neumann etal—Gamut clipping and mapping based on the Coloroid system—CGIV 2004. Second European Conference on Color in Graphics, Imaging, and Vision and Sixth International Symposium on Multispectral Color Science—pp. 548-555—Apr. 5-8, 2004.

Liu etal—"A high saturation mapping algorithm using the gamut partition and variant anchor" —Journal of Xidian University, vol. 33, No. 6, pp. 922-924 and 989, Dec. 2006.

Monga etal—"The use of spatially based complexity measures towards color gamut mapping and image resizing"—Proceedings of the SPIE—The Internaitonal Society for Optical Engineering—vol. 7528-75280H (10 pp.)—Jan. 18, 2010; pp. 1-10.

Search Report Dated March 7, 2014.

\* cited by examiner

METHOD OF CODING A FIRST AND A SECOND VERSION OF AN IMAGE INTO A BASE LAYER AND AN ENHANCEMENT LAYER BASED ON A COLOR GAMUT MAPPING MODEL

This application claims the benefit, under 35 U.S.C. §365 of International Application PCT/EP2013/077938, filed Dec. 23, 2013, which was published in accordance with PCT Article 21(2) on Jul. 3, 2014 in English and which claims the benefit of European patent application No. 12306671.4, filed Dec. 26 2012.

TECHNICAL FIELD

The invention concerns a method for compressing a color-layered image representation.

BACKGROUND ART

Versions of a same video content may differ according to the color gamut of the display device used to display the content. For instance, some display devices may display Wide Color Gamut as other display devices may only display Standard Color Gamut. When different versions of a same video content are to be transmitted under a compressed format towards a display device, several solutions can be used:

1. each version is transmitted towards this display device separately and independently under compressed format;
2. a first version is integrally transmitted towards this display device with an additional "prediction layer" or "enhancement layer" that allows inferring a second version from the first version. This "prediction layer" or "enhancement layer" may notably be calculated, classically, on the basis of the differences between the first and second versions, such differences being compressed for transmission.

The document US2010/0008427 discloses a color gamut scalability technique.

SUMMARY OF INVENTION

According to the invention, it is proposed to calculate the "prediction layer" or "enhancement layer" on the basis of differences that are expressed through parameters applied to any known method of color mapping adapted to transfer colors between a Standard Color Gamut and a Wide Color Gamut. These differences are then compressed before transmission, too.

Advantageously, using parameters of color mapping specific to each pixel will hopefully reduce the memory required for the "prediction layer" or "enhancement layer".

Notably for this purpose, the subject of the invention is a method of coding in a coder a first version of an image and a second version of this image into a base layer and an enhancement layer, wherein each color of the first version (i.e. enhanced) corresponds to a color in the second version (i.e. base layer), comprising the steps of:
  encoding said second version into said base layer,
  choosing a parametric color gamut mapping model able to transform colors in a predetermined mapping color space according to the scalar value of one or two variable(s) depending on said colors,
  for each color of said second version (i.e. base layer), determining corresponding scalar value(s) of said one or two variable(s) such that, if said scalar value(s) is applied to said parametric color gamut mapping model, a mapped color is obtained having a minimal distance in said mapping color space to the color of the first version (i.e. enhanced) corresponding to the said color of second version,
  encoding said determined scalar value(s) of said one or two variable(s) into said enhancement layer.

Using such a method, the mapped colors that are obtained form a mapped version of the same image which is as close as possible to the first version. Therefore, the base layer and the enhancement layer that are obtained allow advantageously not only to obtain the second version of the image by decoding of the base layer, but also to obtain a version of this same image which is very closed to the first version, by decoding of the base layer and of the enhancement layer. Advantageously, the transmission of both versions of the same image though the base layer and the enhancement layer will require a lower bandwidth compared to the transmission of both versions of the same image though the same base layer and an enhancement layer of the prior art, notably because the enhancement layer is based only on one or two scalar values for each color, instead of three scalar values R, G, and B for each color in the prior art.

Preferably, the one or two scalar values on which the enhancement layer is based is/are different for each color. In such a situation, the mapped version of the image can better fit the first version. In a variant exemplified below, the one or two scalar values on which the enhancement layer is the same for all colors belonging to a same zone of the color space, but different for colors belonging to different color zones.

Preferably, the parametric color gamut mapping model is chosen such that it is able to transform colors according to the scalar value of only one variable depending on said colors. Advantageously, the bandwidth required for transmission of both versions of the image is still lower.

Preferably, the method of the invention comprises the step of setting scalar values of a plurality of parameters parametrizing rules defining said parametric color gamut mapping model. The scalar values of said parameters do not depend on the color to map. The setting of the scalar values of this plurality of parameters can be made arbitrarily, for instance, these scalar values can be set to typical values.

Preferably, the scalar value(s) of at least one parameter of said plurality of parameters is set such that the distances between mapped colors to their corresponding colors of the first version (i.e. enhanced) of the same image are minimized. It means that the definition of the parametric color gamut mapping model is preferably adapted to fit at the best the transformation of the first version into the second version.

Preferably, said first version corresponds to a first color gamut and said second version corresponds to a second color gamut, different from the first color gamut.

Preferably, the color mapping space has a luminance axis, the parametric color gamut mapping model is of a type mapping colors along mapping trajectories anchored on anchors points positioned on said luminance axis, the variable depending on the color to map is the mapping distance of this color along the mapping trajectory of this color anchored on its anchor point, and this mapping trajectory and the position of this anchor point on said luminance axis is defined by the application of said rules. In this specific situation, the parametric color gamut mapping model is preferably one of those described in the article entitles "parametric color gamut mapping model using variable anchor points", authored by Chae-Soo Lee, published in 2000 in the Journal of Imaging Science and Technology, N° 44, pages 68-73.

In practice, mapping trajectories are generally straight lines. Mapping trajectories can be specific curves that ensure for example constant hue all over the curve. However, the curve is rarely shaped specifically to match *exactly* the first color. This solution would not be a significant improvement over the prior art, since the amount of information to be transmitted to describe such a curve would not be significantly lower than the amount of information to transmit the first color itself. Thank to the invention, a small amount of information (anchor point, curve type) can give a good prediction of the first colors.

A subject of the invention is also a method of decoding in a decoder a first version of an image encoded into a base layer and an enhancement layer, comprising the steps of:
  decoding said base layer in order to get a second version of said image;
  decoding said enhancement layer in order to get, for each color of said second version, corresponding scalar value(s) of one or two variables;
  for each pixel of said second version, applying the scalar value(s) of said one or two variables corresponding to the color of said pixel to a parametric color gamut mapping model in order to get a corresponding mapped color;
  such than said mapped colors that are obtained provides a mapped version of said image.

Advantageously, two different versions of the same image are obtained, wherein the mapped version is very closed to the original first version that was used to build the enhanced layer.

Preferably, said mapped version corresponds to a first color gamut and said second version corresponds to a second color gamut, different from the first color gamut.

Preferably, the decoding of said enhancement layer is performed in order to get the definition of a parametric color gamut mapping model, including scalar values of a plurality of parameters parametrizing rules defining said parametric color gamut mapping model.

Preferably, said color mapping space has a luminance axis, the parametric color gamut mapping model is of a type mapping colors along mapping trajectories anchored on anchors points positioned on said luminance axis, said one variable is the mapping distance of a color along the mapping trajectory of this color anchored on its anchor point, and this mapping trajectory and the position of this anchor point on said luminance axis is defined by the application of said rules.

A subject of the invention is also a coder for coding a first version of an image corresponding to a first color gamut and a second version of this image corresponding to a second color gamut different from the first color gamut into a base layer and an enhancement layer, wherein each color of the first version corresponds to a color in the second version, wherein a parametric color gamut mapping model able to map colors in a predetermined color space according to the scalar value(s) of one or two variable(s) depending on said colors to map is chosen, said coder comprising:
  a first encoder for encoding said second version into said base layer,
  means for determining, for each color of said second version, corresponding scalar value(s) of said one or two variable(s) such that, when said parametric color gamut mapping model is parametrized with said scalar value(s) and is applied to said color, a mapped color is obtained having a minimal distance in said color space to the color of the first version corresponding to said color of second version,
  a second encoder for encoding said determined scalar value(s) of said one or two variable(s) into said enhancement layer.

A subject of the invention is also a decoder for decoding in a decoder a first version of an image encoded into a base layer and an enhancement layer, comprising:
  a decoder for decoding said base layer in order to get a second version of said image; and for decoding said enhancement layer in order to get, for each color of said second version, corresponding scalar value(s) of one or two variables;
  means for applying, for each pixel of said second version, a parametric color gamut mapping model parametrized with the scalar value(s) of said one or two variables corresponding to the color of said pixel in order to get a corresponding mapped color, such than said mapped colors that are obtained provides a mapped version of said image.

Preferably, scalar values of a plurality of parameters parametrizing rules defining said parametric color gamut mapping model are set, said mapping color space has a luminance axis, the parametric color gamut mapping model is of a type of mapping colors along mapping trajectories anchored on anchors points positioned on said luminance axis, said variable depending on the color to map is the mapping distance of this color along the mapping trajectory of this color anchored on its anchor point, and the coder and/or the decoder comprises means for defining this mapping trajectory and the position of this anchor point on said luminance axis by the application of said rules.

BRIEF DESCRIPTION OF DRAWINGS

The invention will be more clearly understood on reading the description which follows, given by way of non-limiting example and with reference to the appended figures in which.

DESCRIPTION OF EMBODIMENTS

Figure 1:
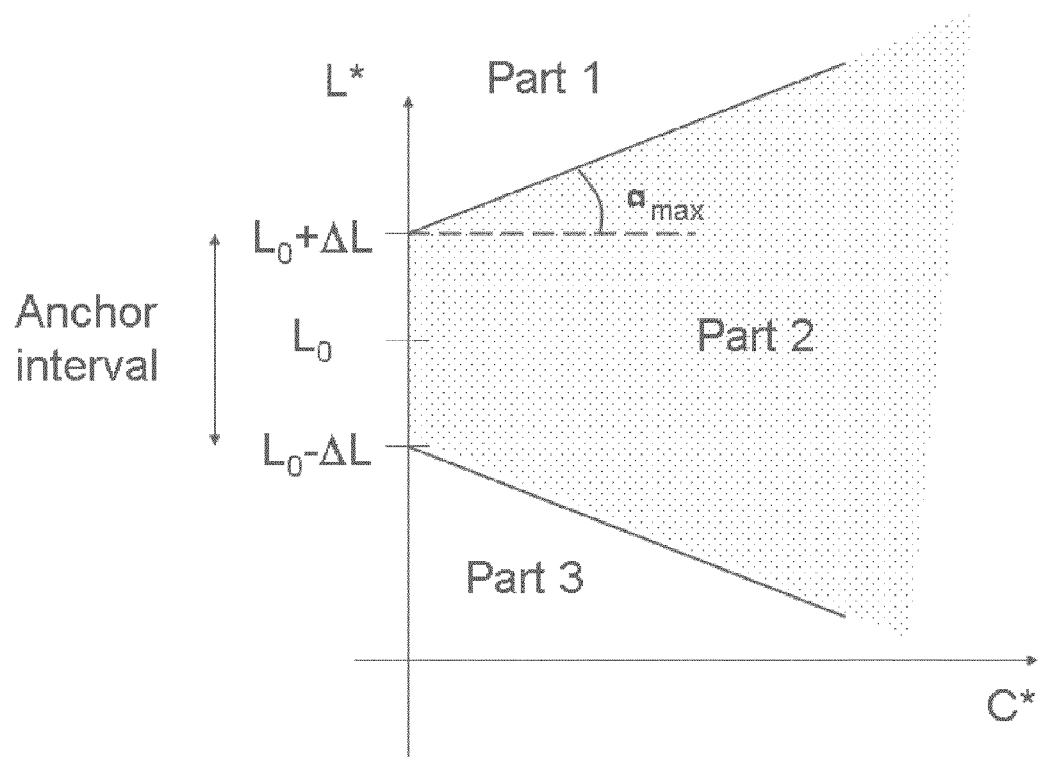
FIG. 1 shows the partition of the mapping color space into three parts according to a main embodiment of the invention.

The following non limiting embodiment will describe the coding of a first version of an image adapted for display devices with a first color gamut and of a second version of the same image adapted for display devices with a second color gamut, different from the first color gamut. The first version corresponds to a wide color gamut and the second version corresponds to a standard color gamut, smaller than the wide color gamut. The different steps of the method of coding may be performed through the use of dedicated hardware as well as hardware capable of executing software in association with appropriate software. The coding is generally performed by using a coder. The decoding is generally performed by using a decoder.

As the two versions concern the same image, by using any known method, it is possible to build a pixel-to-pixel color correspondence between the two versions, and to derive from each color of the second version a corresponding color in the first version. Assuming for instance that the first version is derived from the second version using global color correction—in post-production workflow, such a correction is called "primary color correction"—one can build a color look up table (color LUT) having, as input, all colors present in the second version, and, as output, the corresponding colors in the first version. This case is the case that is primarily addressed by the following embodiment.

The color inputs of the second version and the corresponding color outputs of the first version of this color correspondence LUT of the first case can be represented as points in a color gamut mapping space, here the CIELAB color space, with an arrow or a line showing the color mapping of each color of the second version (called "second color") into a color for the first version (called "first color"). This color gamut mapping space has a luminance axis, more precisely a lightness axis.

In a first step of the invention, the second version is encoded into a base layer, using an encoder. Any encoding method of the prior art can be used for this step, with an appropriate known encoder. For example, the block-based and motion-compensation-based encoding method H.264/MPEG-4 Part 10 or AVC (Advanced Video Coding) of the Moving Picture Experts Group (MPEG) can be employed.

In a second step of the invention, a parametric color gamut mapping model is chosen, that is able to transform colors in the mapping color space CIELAB according to the scalar value of one variable depending on said colors.

Here, the chosen parametric color gamut mapping model is of a type mapping colors along mapping trajectories anchored on anchors points positioned on the luminance axis. The variable depending on the color to map is the mapping distance of this color along the mapping trajectory of this color anchored on its anchor point. The mapping trajectories and the positions of the anchor points on the luminance axis are defined by the application of rules that are defined below. These rules are themselves defined by scalar values of a plurality of parameters such as $L_0$, $\Delta L$ and $\alpha_{max}$ that are defined below.

Such a parametric color gamut mapping model is notably described in the article entitles "parametric color gamut mapping model using variable anchor points", authored by Chae-Soo Lee, published in 2000 in the Journal of Imaging Science and Technology, N° 44, pages 68-73.

The chosen parametric color gamut mapping model will now be defined with more details.

As shown on FIG. 1, the color space is organized into three parts.

Part 2 is the main part of the color space, where the main criteria of the color mapping is the preservation of the contrast. Part 2 is defined by a so-called anchor interval on the luminance axis L* of amplitude $2\Delta L$ centered around a central luminance value $L_0$ as well as by an angle $\alpha_{max}$ between the upper border of this part and a line parallel to the C* axis crossing the luminance axis at a value $L_0+\Delta L$. Part 2 is symmetric in L* direction with respect to the line parallel to the C* axis crossing the luminance axis at a value $L_0$. Part 2 is an open region for the high chroma values C*.

Figure 2:
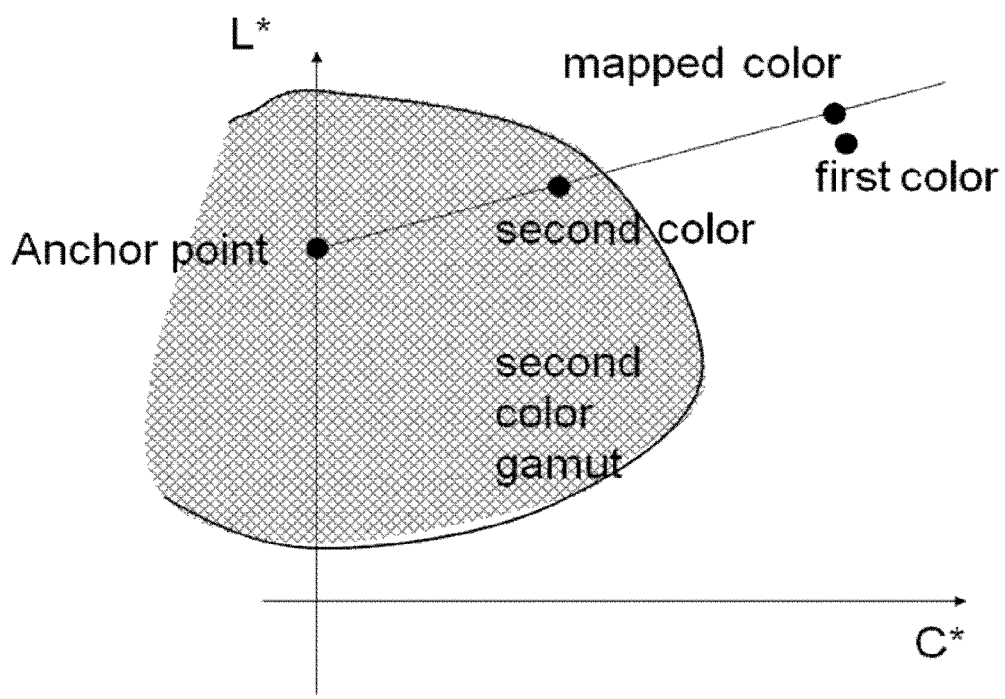
FIG. 2 shows the mapping of a second color of a second version of an image into a mapped color approximating a corresponding first color of a first version of the same image, according to the main embodiment of the invention.

Parts 1 and 3 are the two other parts of the color space that contain colors of high and low luminance, respectively. In this part, the main criterion of the color mapping is the preservation of the color saturation, as much as possible. In parts 1 and 3, saturation is—even before mapping—naturally not very strong for two reasons. First, the lower border of part 1 and the higher border of part 3 correspond respectively with the higher and lower borders of part 2, as defined above, notably by the angle $\alpha_{max}$. By this, colors of high saturation are located in part 2 as shown in FIG. 1. Second reason is the typical shape of color gamuts that are usually convex and do not contain highly saturated colors with very high or very low luminances. See FIG. 2 as an example of a color gamut for the second colors, called "second color gamut". As the first color shown on FIG. 2 is out of the "second color gamut", it means that the color gamut for the first colors is larger than the "second color gamut".

Here, one of the rules defining the parametric color gamut mapping model asserts that the mapping trajectories are straight lines. Setting the position of an anchor point on the luminance axis is then enough to define a mapping trajectory as soon as this mapping trajectory should anyway pass through this anchor point and through the color to map.

Therefore, an anchor point defines into which direction a color of a second version (having coordinates L,C) of the image is to be mapped into a mapped color (having coordinates L",C") that should predict the corresponding color for the first version (or "first color") of this image (having coordinates L',C'). As shown in FIG. 2, the color of a second version (or "second color") can be mapped along a straight mapping trajectory in a way that the non-coded or decoded color of a first version (or "first color") is inside the first color gamut as shown on this figure.

According to rules defining the parametric color gamut mapping model and described with more details below, anchor points are positioned on the luminance axis L* in the anchor interval shown in FIG. 1. Depending on the part of color space to which belongs the color to map ("second color"), three different rules, defined by the parameters $L_0$ and $\Delta L$, are used to position of the corresponding anchor point on the luminance axis:

For second colors located in part 1 of the color space, the anchor point is always at the position $L_0+\Delta L$;

For second colors located in part 2 of the color space, an anchor point is chosen between the position $L_0-\Delta L$ and the position $L_0+\Delta L$ according to a specific rule defined below, depending only on this color to map; other rules may be used instead of the rule defined below;

For second colors located in part 3 of the color space, the anchor point is always at the position $L_0-\Delta L$.

Part 1 of the color space contains bright colors having a high luminance and low to medium saturation. Choosing an anchor point at the position $L_0+\Delta L$ has the effect that the direction of mapping will have a strong component in L* direction and a smaller component in C* direction. The visible effect will be that, after mapping, the mapped color has reduced luminance but few changes in saturation.

Part 3 contains dark colors having a low luminance and low to medium saturation. In a way comparable to the processing in part 1, the visible effect will be that, after color mapping, the obtained mapped color has increased luminance but few changes in saturation.

The overall impression of mapping colors located in parts 1 and 3 is that the contrast is reduced but the saturation is preserved.

Part 2 contains colors of medium luminance and low, medium and high saturation. The choice of anchor points on the anchor interval between $L_0-\Delta L$ and $L_0+\Delta L$ on the L* axis has the effect that the direction of mapping will have a small component in L* direction and a larger component in C* direction. The visible effect will be that, after mapping, the mapped color has reduced saturation but few changes in contrast.

This color mapping procedure aims to ensure homogeneity in the color mapping trajectories. Homogeneous trajectories ensure that the mapping of neighbored colors is somehow "similar" and preserves the relation between the colors. For example, two "second colors" with same luminance and same hue are supposed to have very close luminance and hue after mapping.

The homogeneity can be achieved by the following characteristics:

In part 2, all "second colors" lying on a same color mapping trajectory have their corresponding "mapped colors" on this trajectory and are mapped in the direction of/from the same anchor point.

A second anchor point neighbored to a first anchor point has such a color mapping trajectory associated which is as close as possible to the color mapping trajectory of the first anchor point.

"Second colors" lying on these neighbored color mapping trajectory are thus color mapped in a similar manner.

There is no crossing of color mapping trajectories.

These characteristics are achieved by calculating the position of the anchor points on the L* axis according to the following rules.

For second colors which have lightness L lower than $L_0$:

$$L_{anchor} = \begin{cases} L_0 - \Delta L & \text{if} \quad L < L_0 - \Delta L - C * f_{MAX} \\ L_0 - \dfrac{f}{f_{MAX}} * \Delta L & \text{if} \quad L_0 - \Delta L - C * f_{MAX} \leq L \leq L_0 \end{cases}$$

where L and C are respectively lightness and chroma of the second color, $\Delta L$ is the half interval length on lightness axis, $f_{MAX}$ is a normalization factor defined according to the equation:

$$f_{MAX} = \frac{L_{MAX}}{C_{MAX}} * \tan(\alpha_{MAX})$$

where $L_{MAX}$ and $C_{MAX}$ are respectively maximum values of lightness and chroma, for example the limits of L*a*b* color space, $\alpha_{MAX}$ is the maximum angle chosen, and f is defined according to the equation:

$$f = \frac{L_0 - L}{C * f_{MAX} + \Delta L} * f_{MAX}.$$

For second colors which have lightness L greater than $L_0$:

$$L_{anchor} = \begin{cases} L_0 + \Delta L & \text{if} \quad L > L_0 + \Delta L + C * f_{MAX} \\ L_0 + \dfrac{f}{f_{MAX}} * \Delta L & \text{if} \quad L_0 + \Delta L + C * f_{MAX} \geq L \geq L_0 \end{cases}$$

with $$f = \frac{L - L_0}{C * f_{MAX} + \Delta L} * f_{MAX}.$$

Figure 3:
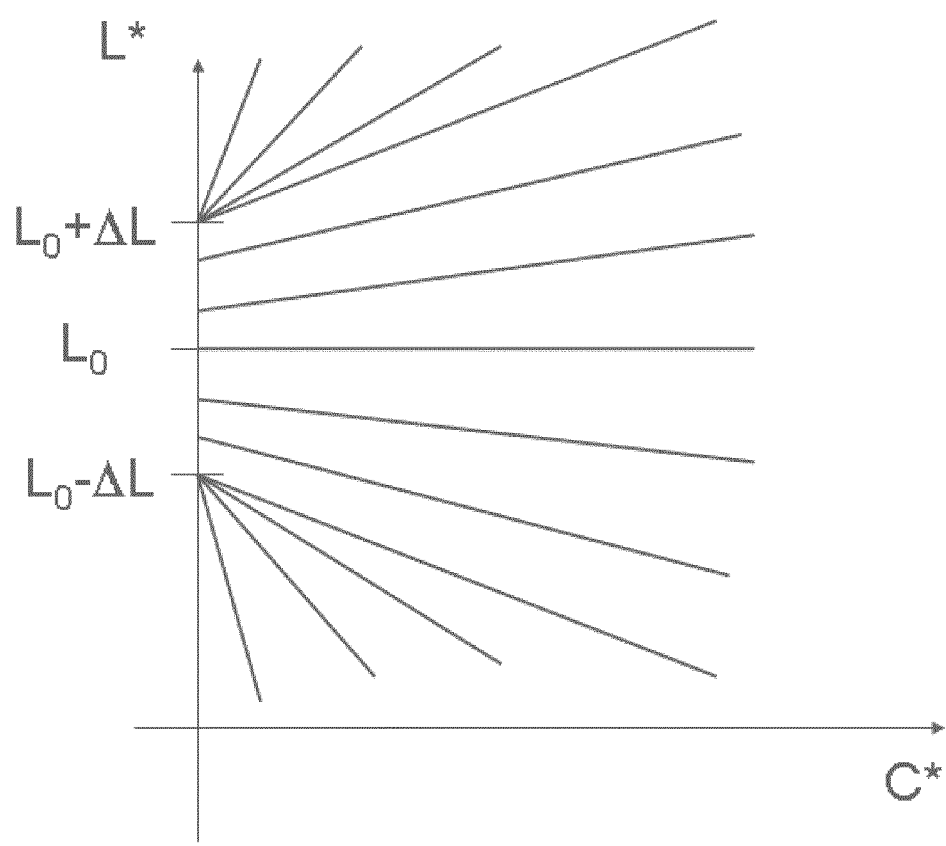
FIG. 3 shows an array of mapping trajectories used to map the colors of the second version such that mapped colors approximates the colors of the first version according to the main embodiment of the invention.

The anchor points determined according to these rules above ensure homogeneous mapping trajectories such as shown in FIG. 3.

In a third step of the invention, the scalar values of a plurality of parameters $L_0$, $\Delta L$ and $\alpha_{max}$ parametrizing the rules above are set. These values can be simply set to typical values, or can be set according more complex process as explained below.

The scalar value of $L_0$ is simply set to 50, i.e. a typical value for color mapping between display gamuts.

The scalar value of $\Delta L$ is estimated from a minimization of a cost function based on the sum of two functions $S_1$ and $S_2$; the values of these functions are given by the following two sets of equations:

1. The first set of equations is built from all mapping trajectories hitting the L* axis above 50 and assumes a unique anchor point at $50+\Delta L$. If we have N second colors with the coordinates $L_i, C_i$ $0 \leq i < N$ and the first $M < N$ second colors are characterized by $L_i > 50$ for $0 \leq i < M$ we calculate the sum of distances between the trajectories and the corresponding first colors according to $$S_1 = \sum_{i=0}^{M-1} \left\| \begin{bmatrix} L_i - L_0 - \Delta L \\ -(C_i) \end{bmatrix} \cdot \begin{bmatrix} -C'_i \\ L_0 + \Delta L - L'_i \end{bmatrix} \right\|$$

where $L'_i, C'_i, 0 \leq i < N$ are the coordinates of the corresponding first colors.

2. The second set of equations is built from all mapping trajectories hitting the L* axis below 50 and assumes a unique anchor point at $50 - \Delta L$ given the following sum:

$$S_2 = \sum_{i=M}^{N-1} \left\| \begin{bmatrix} L_i - L_0 + \Delta L \\ -(C_i) \end{bmatrix} \cdot \begin{bmatrix} -C'_i \\ L_0 - \Delta L - L'_i \end{bmatrix} \right\|$$

Then, using a linear regression method, the sum S1+S2 is minimized giving the optimal scalar value of $\Delta L$.

According to the above process, the scalar value of one parameter, here $\Delta L$, defining the rules of definition of the parametric color gamut mapping model is set such that the distances between mapped colors to their corresponding colors of the first version of the same image are minimized.

Then, the scalar value of parameter $\alpha_{max}$ is simply set to 50 degrees, a typical value for color mapping between display gamuts. Another possibility is to set the scalar value of $\alpha_{max}$ using a similar regression scheme as used for $\Delta L$ above, which minimizes the distance between mapped colors to their corresponding colors of the first version of the same image.

The scalar values of other parameters cited above, as $L_{MAX}$ and $C_{MAX}$, are set to 100 and 150, respectively.

Instead of being set as above, the scalar values of parameters $L_0$, $\Delta L$ and $\alpha_{max}$ may be all set arbitrarily, preferably based on typical values of 50, 30 and 70 degrees, respectively.

The parametric rules defining the mapping trajectories and the positions of the anchor points being set as described above, the scalar values of the parameters defining these rules being set as described above, the question is now the definition of the scalar value of the variable depending on the color to map. As already stated above, this variable is the mapping distance along the mapping trajectory of this color, this mapping trajectory being anchored on the anchor point of this color.

Therefore, in a fourth step of the invention, for each color of the second version of the image having coordinates L,C, the scalar value of the mapping distance attached to this color is determined such that, if applied to the parametric color gamut mapping model as defined above, a mapped color is obtained having coordinates L",C" such as having a minimal distance d in the CIELAB mapping color space to the corresponding color of the first version (having coordinates L',C'). This mapped color is the color that is closest to the corresponding first color while lying on the mapping trajectory as shown on FIG. 2.

The distance d between this first color and any color mapped from the second color is calculated as follows: $d=\sqrt{(L'-L'')^2+(C'-C'')^2}$, with L',C' being the coordinates of the first color, and L",C" being the coordinates of a mapped color. If the mapping direction is in direction of the anchor point, d is positive, else d is negative. The final mapped color corresponding to the second color is the color for which the value of the distance d is minimized, as shown on FIG. 2.

Through this calculation, different values of distances are generally obtained for different colors.

In a fifth step of the invention, the scalar values of all obtained distances are encoded in a manner known per se into an enhancement layer. Preferably, the scalar values, as set above, of the parameters defining the rules defining themselves the parametric color gamut mapping model are also encoded into this enhancement layer.

The above method is generally implemented on a coder.

Using the above method, the mapped colors that are obtained form a mapped version of the same image, which is as close as possible to the first version. Therefore, the base layer and the enhancement layer that are obtained allow advantageously not only to obtain the second version of the image by decoding of the base layer, but also to obtain a version of this same image which is very closed to the first version, by decoding of the base layer and of the enhancement layer. Advantageously, the transmission of both versions of the same image though the base layer and the enhancement layer will require a lower bandwidth compared to the transmission of both versions of the same image though the same base layer and an enhancement layer of the prior art, notably because the enhancement layer is based only on one scalar value for each color, instead of three scalar values R, G, and B for each color in the prior art.

Different variants of the above method of coding may be used without departing from the invention.

For instance, keeping the same type of parametric color gamut mapping model, mapping trajectories different from straight lines may be used. Other types of curves such as polygons, splines and in general non-linear curves can be used as mapping trajectories. Since these curves have more degrees of freedom than a straight line, they can be optimized with respect to a set of criteria including human visual system and a specific target device. For example, the mapping trajectories may be more horizontal (less changing the luminance) in regions of the color space where the human eye perceives more color differences linked to luminance changes or less horizontal in regions of the color space where the target display has worse luminance resolution in order to avoid banding.

Another more general variant would be to use another type of parametric color gamut mapping model, which is fitted in a manner known per se to the color correspondences between the first and the second version by an estimation procedure.

An example of another parametric color gamut mapping model is based on a non linear function defined by three parameters as shown in the following equation:

$$C_{ref}=G\{C_{test}\}^{\gamma}+b$$

Here, $C_{ref}$ are the color coordinates of the mapped color and $C_{test}$ are the color coordinates of a color of the second version of the image. Parameter G defines the gain, parameter γ defines the gamma and parameter b defines the offset of the non linear function. This function is usually called GOG (Gamma, Offset and Gain). In order to get a mapped color that well fit with the corresponding color of the second version, the values of these parameters differ according to different zones in the color space.

In the following, we explain how to robustly estimate the parameters of this GOG color mapping model. As example, let us consider the set of color correspondences between colors of the second version and colors of the first version. These color correspondences can be expressed separately for respectively each of the three color channels R, G and B, for the two versions of the same image. Using these color correspondences, the issue is to robustly estimate the model parameters γ, b, G for each zone of the color space. Here robust means that the estimation should preferably not be influenced by outliers.

Here we face two main challenges. Firstly, we hypothesize that the more the color correspondences contain lot of outliers, as it is usually the case, the more the least square estimation model is erroneous. Secondly, considering a general model which may be responsible for color difference, the estimation model should be non linear. Therefore, to address these two main challenges, we propose to use a robust non linear regression model over each zone of the color space, which is based upon a method already referenced about, called "ROUT". However, other methods can be used as well.

The robust estimation model is performed in two steps which are inspired from this ROUT method. First, we iteratively classify the outliers and inliers in the list of color correspondences within each zone of the color space. First, the model parameters are computed from all color correspondences from the red channel, from the green channel and from the blue channel. Next, outliers are detected and removed. Then, the model parameters are refined from inliers only.

Next, for each of the color channels and for each zone of the color space, we estimate the scalar values of the parameters γ, b, G defining the parametric model from the inliers using the least square method.

The other steps of this variant of the invention are the same as described above for the main embodiment.

An embodiment of the method of decoding according to the invention will now be described, which is consistent with the main encoding embodiment given above. Such a method of decoding is generally implemented on a decoder.

A base layer and an enhancement layer of an image are provided to a decoder. The method of decoding comprises the following steps.

The first step is the decoding of this base layer in a manner reverse to the encoding operation above, in order to get a second version of the image.

The second step is the decoding of this enhancement layer in order to get:
    the definition of a parametric color gamut mapping model of a type mapping colors along mapping trajectories anchored on anchors points positioned on said luminance axis, including rules to define mapping trajectories and positions of the anchor points, and scalar values of parameters parametrizing these rules;

for each color of the second version decoded in the base layer, corresponding scalar value of a mapping distance.

In a third step, for each color of the second version decoded in the base layer, i.e. so-called second color, and having the coordinates L,C, the following steps are carried out:

the position of the anchor point on the luminance axis, namely $L_{anchor}$, is calculated according to the rules as described above, using the scalar values of the parameters decoded in the enhancement layer;

the mapping trajectory is calculated being the straight line passing through the second color having the coordinates L,C and through the calculated anchor point;

the mapped color having coordinates L",C" is calculated by mapping the second color along the calculated mapping trajectory over a mapping distance having a scalar value d corresponding to this second color and decoded from the enhanced layer.

The mapped color that is obtained is considered as a prediction of the first color of the main embodiment above.

Basically, the third step of the decoding method is, for each pixel of the second version, the application of the scalar value of the mapping distance corresponding to the color of this pixel to the parametric color gamut mapping model as defined in the second step in order to get a corresponding mapped color. All mapped colors that are obtained then provide a mapped version of the image.

At the end of the process, two different versions of the same image are obtained, where the mapped version is very closed to the original first version that was used above to build the enhanced layer.

It is to be understood that the invention may be implemented on coder and/or decoder in various forms of hardware, software, firmware, special purpose processors, or combinations thereof. The invention may be notably implemented as a combination of hardware and software. Moreover, the software may be implemented as an application program tangibly embodied on a program storage unit. The application program may be uploaded to, and executed by, a coder and/or decoder comprising any suitable architecture. Preferably, the coder and/or decoder is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU which is part of the coder and/or decoder. In addition, various other peripheral units may be connected to the computer platform such as an additional data storage unit and a printing unit.

While the present invention is described with respect to a particular embodiment, it is understood that the present invention is not limited to this embodiment. The present invention as claimed therefore includes variations of this embodiment, as will be apparent to one of skill in the art. While some of the specific embodiments may be described and claimed separately, it is understood that the various features of embodiments described and claimed herein may be used in combination. Reference numerals appearing in the claims are by way of illustration only and shall have no limiting effect on the scope of the claims.

The invention claimed is:

1. Method of coding in a coder a first version of an image corresponding to a first color gamut and a second version of this image corresponding to a second color gamut different from the first color gamut into a base layer and an enhancement layer, wherein each color of the first version corresponds to a color in the second version, comprising:

encoding said second version into said base layer, choosing a parametric color gamut mapping model able to map a color in a color space having a luminance axis, along a mapping trajectory anchored on an anchor point positioned on said luminance axis, and according to a mapping distance of this color along said mapping trajectory, and setting scalar values of a plurality of parameters parametrizing rules defining the mapping trajectory and the position of the anchor point on said luminance axis, for each color of said second version, determining a mapping distance of this color along its mapping trajectory such that, when said parametric color gamut mapping model is parametrized with said scalar values and is applied to said color, a mapped color is obtained having a minimal distance in said color space to the color of the first version corresponding to said color of second version, encoding said set scalar values and said determined mapping distances into said enhancement layer.

2. Method of coding according to claim 1 wherein the scalar values of at least one parameter of said plurality of parameters is set such that the distances between mapped colors to their corresponding colors of the first version of the same image are minimized.

3. Method of decoding in a decoder a first version of an image encoded into a base layer and an enhancement layer, comprising:

decoding said base layer in order to get a second version of said image;

decoding said enhancement layer in order to get:

scalar values of a plurality of parameters parametrizing rules defining a mapping trajectory and a position of an anchor point on a luminance axis, wherein a color gamut mapping model is defined as being able to map colors in a color space having said luminance axis along said mapping trajectories anchored on said anchors points positioned on said luminance axis, and for each color of said second version, a mapping distance of this color along its mapping trajectory;

for each pixel of said second version, applying said parametric color gamut mapping model parametrized with said decoded scalar values to map the color of said pixel according to the decoded mapping distance corresponding to the color of said pixel in order to obtain a corresponding mapped color, wherein said mapping is performed along a mapping trajectory anchored of an anchor point which are defined by the application of said parametrizing rules, wherein said mapped colors that are obtained form said decoded first version of said image.

4. Method of decoding according to claim 3 wherein said first version corresponds to a first color gamut and said second version corresponds to a second color gamut, different from the first color gamut.

5. Coder for coding a first version of an image corresponding to a first color gamut and a second version of this image corresponding to a second color gamut different from the first color gamut into a base layer and an enhancement layer, wherein each color of the first version corresponds to a color in the second version, wherein a parametric color gamut mapping model is chosen which is able to map a color in a color space having a luminance axis, along a mapping trajectory anchored on an anchor point positioned on said luminance axis, and according to a mapping distance of this color along said mapping trajectory, said coder comprising:
 a memory configured to store computer instructions;
 one or more processors configured to execute the stored computer instructions for:
  encoding said second version into said base layer,
  defining, for each color to map according to said parametric color gamut mapping model, a mapping trajectory and a position of an anchor point on said luminance axis by the application of rules parametrized by a plurality of parameters and configured to set scalar values of these parameters,
  determining, for each color of said second version, a mapping distance of this color along its mapping trajectory such that, when said parametric color gamut mapping model is parametrized with said set scalar values and is applied to said color, a mapped color is obtained having a minimal distance in said color space to the color of the first version corresponding to said color of second version,
  encoding said set scalar values and said determined mapping distances into said enhancement layer.

6. Decoder for decoding a first version of an image encoded into a base layer and an enhancement layer, comprising:
 a memory configured to store computer instructions;
 one or more processors configured to execute the stored computer instructions for decoding said base layer in order to get a second version of said image; and for decoding said enhancement layer in order to get:
 scalar values of a plurality of parameters parametrizing rules defining a mapping trajectory and a position of an anchor point on a luminance axis, wherein a color gamut mapping model is defined as being able to map colors in a color space having said luminance axis along said mapping trajectories anchored on said anchors points positioned on said luminance axis, and,
 for each color of said second version, a mapping distance of this color along its mapping trajectory;
 the one or more processors further configured for applying, for each pixel of said second version, said parametric color gamut mapping model parametrized with said decoded scalar values to map the color of said pixel according to the decoded mapping distance corresponding to the color of said pixel in order to get a corresponding mapped color,
 wherein said mapping is performed along a mapping trajectory anchored of an anchor point which are defined by the application of said parametrizing rules,
 wherein said mapped colors that are obtained form said decoded first version of said image.

7. Decoder according to claim 6, wherein said first version corresponds to a first color gamut and said second version corresponds to a second color gamut, different from the first color gamut.

* * * * *